Patented July 7, 1942

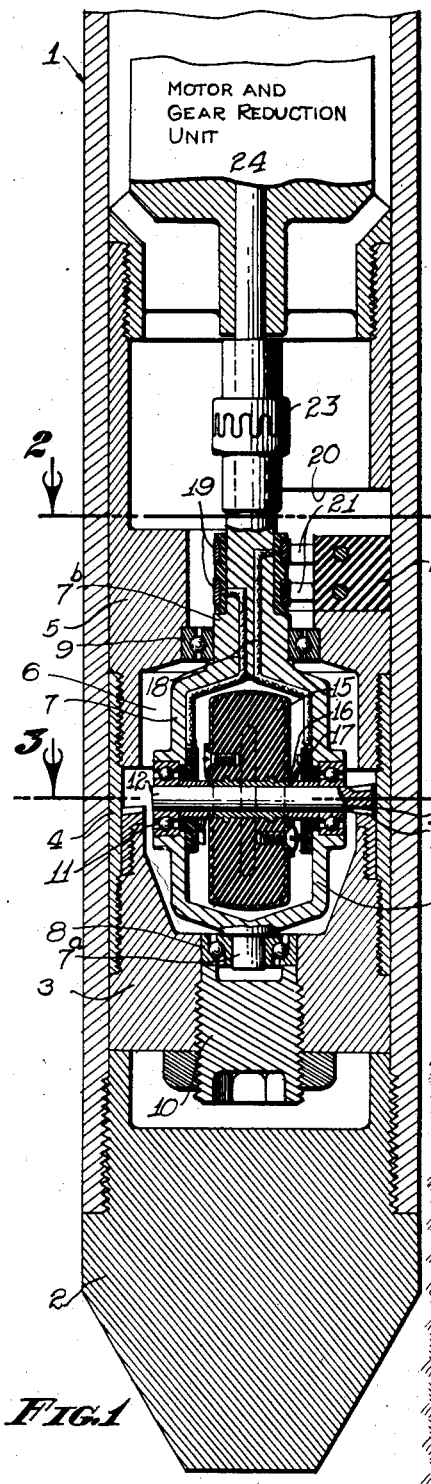

2,288,876

UNITED STATES PATENT OFFICE 2,288,876

MAGNETIC LOGGING

James C. Arnold, Los Angeles, Calif., assignor to Lane-Wells Company, Los Angeles, Calif., a corporation of Delaware Application January 21, 1941, Serial No. 375,277

3 Claims. (Cl. 175—182)

My invention relates to magnetic logging, more particularly to magnetic logging within uncased well bores, and is predicated upon the theory that at the time the sedimentary beds were laid down all magnetic materials were floating and free to orient in the magnetic meridian of that age and time. Each bed of differing material was laid down at a different age and the lines of demarcation between them are assumed to have occurred during a geologic hiatus.

The magnetic meridian is continually changing now and presumably was different for each of these geologic eras. This has been well established by measurement of the magnetic properties of cores removed from well bores.

Assuming that the distribution of magnetic particles has been uniform, detectable variation is thus established, varying from a condition in which the magnetic axis of the formation corresponds with the present earth's magnetic field to a condition in which the magnetic axis of the formation is in opposition to the earth's field. Furthermore, the distribution of magnetic particles throughout the sedimentary beds is not uniform, so that an additional source of variation is available; namely, the actual intensity or strength of the field produced by the magnetic particles.

Among the objects of my invention are:

First, to provide a method and apparatus for magnetically logging well bores wherein the magnetic field in all directions is measured and magnetic anomalies, whether due to differences in the axes of the different formations or differences in the strength thereof, are measured for comparison of records obtained from other wells or for direct interpretation;

Second, to provide an apparatus of this character which, although designed to make delicate electrical measurements, is particularly sturdy and rugged of construction and capable of withstanding the rough treatment incidental to movement along a well bore;

Third, to provide an apparatus which may be suspended from a single conductor cable and connected through such cable with conventional recording apparatus; and Fourth, to provide an apparatus of this character whereby an alternating current signal is produced which is capable of being readily distinguished and separated from direct current or other alternating current whereby a single conductor cable may be utilized, both to transmit the signal from the apparatus and transmit the necessary electrical power to drive or operate the apparatus.

With the above and other objects in view, as may appear hereinafter, reference is directed to the accompanying drawing, in which:

Figure 1 is a fragmentary longitudinal sectional view of my apparatus;

Figure 2 is a transverse sectional view through 2—2 of Figure 1;

Figure 3 is a transverse sectional view through 3—3 of Figure 1;

Figure 4 illustrates the character of the record obtained with my apparatus; and Figure 5 is a diagrammatical view showing my apparatus in a well bore and indicating its electrical connection with a source of electrical energy and with a recorder.

The apparatus is contained within a case 1 which is suitably attached to an electrical conductor cable 31 and its lower end is closed by an end piece 2. Secured within the casing is a lower bearing mounting block 3 which is screw-threaded to a sleeve 4 that is in turn joined to an upper bearing mounting block 5. The two mounting blocks and sleeve form a chamber 6 in which is vertically positioned a frame 7. The frame 7 is in the form of a loop having a lower stem 7a which fits a lower bearing 8 provided in the lower mounting block and an upper stem 7b which fits an upper bearing 9 provided in the upper bearing block, so that the frame may rotate about a vertical axis. An adjustment screw 10 may coact with the lower bearing. The frame 7 journals in its loop position, by means of bearings 11, a cross shaft 12. One end of the cross shaft 12 is provided with a pinion gear 13 which is adapted to mesh with a ring gear 14 provided at the inner axial end of one of the mounting blocks, in this case the lower mounting block. Thus, as the frame 7 is rotated about a vertical axis the cross shaft 12 is caused to rotate about a horizontal axis at a speed greater than the rotation of the frame.

An inductor coil 15 is mounted on the cross shaft 12 within the frame 7. The inductor coil may be divided into two coil units on opposite sides of the cross shaft, which coil units may be molded in insulating material so that the inductor coil or coils may be rotated as a unit with the cross shaft 12. The inductor coil 15 is connected by brushes 16 to collector rings 17 mounted on the frame 7. The collector rings in turn are connected by conductors 18 to slip rings 19 provided on the stem 7b above its upper bearing 9. Opposite the slip rings 19 the upper bearing mounting block 5 is provided with a notched portion 20 exposing the slip rings. Brushes 21 engage the slip rings and are supported on an insulated mounting block 22. The stem 7b of the frame 7 is connected by a coupling 23 to a drive unit 24 which may be an electric or spring-driven motor with suitable gears for turning the frame 7 at the desired speed. If the motor is electrically driven it may be operated from batteries or from a generator 32 at the earth's surface.

Operation of my apparatus is as follows: The inductor coil 15 is caused to rotate about the horizontal axis of the cross shaft 12 and also to turn about the vertical axis of the frame 7. The coil, of course, rotates on its horizontal axis at a considerably greater speed than it turns on its vertical axis. By reason of the rotation of the inductor coil 15 it is caused to cut the magnetic lines of force which traverse the well bore in which the apparatus is lowered. By reason of the universal movement of the inductor coil, both about a horizontal axis and a vertical axis, the inductor coil cuts the lines of force in all directions. Thus, for a given vertical rotation of the frame 7 the inductor coil has sampled the magnetic field in all directions and there is induced in the electrical circuit connected with the inductor coil a current which varies from zero to a maximum and back to zero for each half turn of the frame 7.

This varying current induced in the inductor coil 15 is transmitted through the cable which supports the apparatus to a suitable conventional recording apparatus located at the earth's surface, such as a recording galvanometer 33. Such recording apparatus may be connected with the hoist (not shown) which raises and lowers the cable from which the apparatus is suspended, and a graph or chart such as shown in Figure 4 may be drawn and interpreted in terms of depth of well bore.

The frame and inductor coil are, of course, rotated at a constant speed by the drive unit 24 and, consequently, the resulting impulses picked up by the inductor coil will be in the nature of alternating current at a predetermined frequency, but varying intensity. Therefore, by the use of proper filters a single conductor line from which the apparatus is suspended may transmit direct current for the purpose of driving the motor without such a current interfering with the current induced in the inductor coil. Such practice of transmitting both alternating current and direct current, or currents of different frequencies on a common line is, of course, old and well established practice. Also, the drive unit may be operated from batteries contained within the apparatus itself.

Various changes and alternate arrangements may be made within the scope of the appended claims, in which it is my intention to claim all novelty inherent in the invention as broadly as the prior art permits.

I claim:

1. A method of magnetically logging well bores, characterized by: rotating an inductor coil simultaneously about two right angularly disposed axes while moving said inductor coil along a well bore; and recording with respect to the location of said inductor coil in said well bore the current fluctuations induced in said inductor coil from the magnetic field traversed by the well bore.

2. An apparatus for the magnetic logging of well bores, comprising: an inductor coil; means for rotating said coil at a predetermined speed about a vertical axis; and means for rotating said coil at a predetermined greater speed about a horizontal axis, whereby the magnetic field traversed by the well bore induces a plurality of impulses in said coil for each rotation thereof about said vertical axis.

3. An apparatus for the magnetic logging of well bores, comprising: a frame journaled about a vertical axis; an inductor coil mounted in said frame for rotation about a horizontal axis; ring gear and pinion means for rotating said induction coil about its horizontal axis as said frame rotates about said vertical axis, whereby the magnetic field traversed by the well bore induces impulses in said coil for each rotation of said frame about its vertical axis.

JAMES C. ARNOLD.